(12) United States Patent
Roush

(10) Patent No.: US 8,888,165 B2
(45) Date of Patent: Nov. 18, 2014

(54) TRAILER ROOF WITH REMOVABLE PANELS

(71) Applicant: Mark Roush, Lafayette, IN (US)

(72) Inventor: Mark Roush, Lafayette, IN (US)

(73) Assignee: Vanguard National Trailer Corp., Monon, IN (US)

( * ) Notice: Subject to any disclaimer, the term of this patent is extended or adjusted under 35 U.S.C. 154(b) by 0 days.

(21) Appl. No.: 13/775,449

(22) Filed: Feb. 25, 2013

(65) Prior Publication Data

US 2014/0239666 A1 Aug. 28, 2014

(51) Int. Cl.
*B62D 33/04* (2006.01)
*B60P 7/02* (2006.01)

(52) U.S. Cl.
CPC .................................. *B60P 7/02* (2013.01)
USPC ............................. 296/185.1; 296/210

(58) Field of Classification Search
USPC ................ 296/98, 58, 59, 37.7, 210, 100.01, 296/100.04, 100.11, 100.12, 100.15, 100.18
IPC ............................................ B62D 25/06,33/04
See application file for complete search history.

(56) References Cited

U.S. PATENT DOCUMENTS

| | | | |
|---|---|---|---|
| 2,921,814 A * | 1/1960 | Mede .............................. 296/215 |
| 3,205,001 A * | 9/1965 | Abolins ........................... 52/280 |
| 4,182,532 A | 1/1980 | Walker ........................... 296/210 |
| 4,214,789 A | 7/1980 | Katz ............................. 296/186.3 |
| 4,479,677 A | 10/1984 | Gulette ............................. 296/98 |
| 4,502,610 A * | 3/1985 | Todd .............................. 220/315 |
| 4,623,189 A | 11/1986 | Stead ........................... 296/186.2 |
| 5,294,016 A | 3/1994 | Crenshaw ...................... 220/380 |
| 6,712,418 B1 | 3/2004 | Lathers ..................... 296/100.02 |
| 7,011,358 B2 | 3/2006 | Graaff ........................... 296/186.1 |
| 7,163,253 B2 | 1/2007 | Montagna ................. 296/100.02 |
| 7,210,727 B2 * | 5/2007 | Stephenson et al. .......... 296/104 |
| 7,316,444 B2 | 1/2008 | Montagna ................. 296/100.02 |
| 7,878,573 B2 | 2/2011 | Limbacher ............... 296/100.18 |
| 7,926,866 B2 | 4/2011 | Schmidt ..................... 296/181.1 |
| 8,109,403 B2 * | 2/2012 | Michel ........................ 220/254.1 |
| 2007/0210608 A1 | 9/2007 | Klein ......................... 296/100.02 |
| 2008/0100077 A1 | 5/2008 | Schmidt ........................ 296/24.3 |
| 2009/0159592 A1 | 6/2009 | Vitalis ............................. 220/1.5 |
| 2009/0230727 A1 * | 9/2009 | Ehrlich et al. ............. 296/185.1 |
| 2011/0169301 A1 | 7/2011 | Schmidt ..................... 296/185.1 |
| 2011/0260500 A1 * | 10/2011 | Brooks et al. .............. 296/185.1 |

* cited by examiner

*Primary Examiner* — Pinel Romain

(74) *Attorney, Agent, or Firm* — Taft Stettinius & Hollister, LLP; Brian Lynch

(57) ABSTRACT

A cargo container is disclosed having removable panels secured between roof bows that extend across the width of the cargo container. The roof bows may be constructed out of a metal or high strength composite material while the panels may be constructed from a similar high strength material or a lightweight plastic depending on the intended use of the trailer. A top sheet over the roof bows maybe required to secure the panels to the bows, or the top sheet may be optional for additional protection from the weather. Insulation may also be placed between the top sheet and panels if the container is to be used to carry refrigerated cargo.

20 Claims, 6 Drawing Sheets

TRAILER ROOF WITH REMOVABLE PANELS

FIELD OF THE INVENTION

The present invention relates generally to a roof construction for a cargo container, and more particularly to a roof construction with anti-snag removable panels secured between roof bows.

BACKGROUND OF THE INVENTION

Refrigerated containers and dry van trailers are extensively used internationally. The lower portions of the container typically experience far more wear and abuse than the upper portions, however the roofs are occasionally damaged due to improper loading of cargo or by a fork lift operator's carelessness.

Trailers have typically been constructed as open top containers for bulk materials or as closed top containers for dry goods. Open top cargo containers allow for easy loading of bulk goods, such as corn and other food stuffs, but are not sufficiently watertight to carry goods that may be damaged by exposure to moisture. Conversely, closed top over the road containers provide their cargo with excellent protection from the elements, but are more difficult to load.

SUMMARY OF THE INVENTION

The present invention provides an improved roof for a cargo container having removable panels secured between roof bows that extend across the width of the cargo container. The roof bows are preferably constructed out of a metal or high strength composite material while the panels may be constructed from a similar high strength material or a lightweight plastic depending on the intended use of the cargo container. A top sheet over the roof bows maybe required to secure the panels to the bows, or the top sheet may be optional for additional protection from weather. Insulation may also be placed between the top sheet and panels if the container is to be used to carry refrigerated cargo.

DETAILED DESCRIPTION

The present invention may be used with any type of cargo container roof and is particularly suited for containers that experience a great deal of wear and/or need to be highly configurable. However, for descriptive purposes, the present invention will be described in use with over the road trailers.

Figure 1:
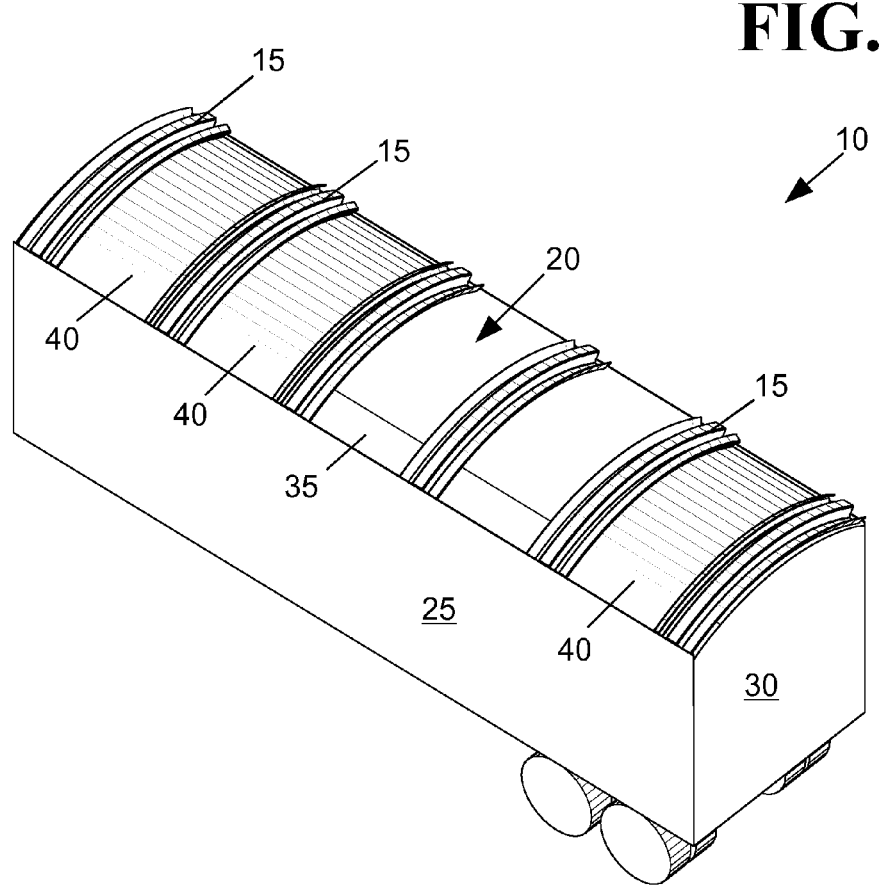
FIG. 1 shows a perspective example of a trailer having a roof with multiple panels secured between roof bows where some of the panels have been removed to allow for top loading of the trailer.
Figure 2:
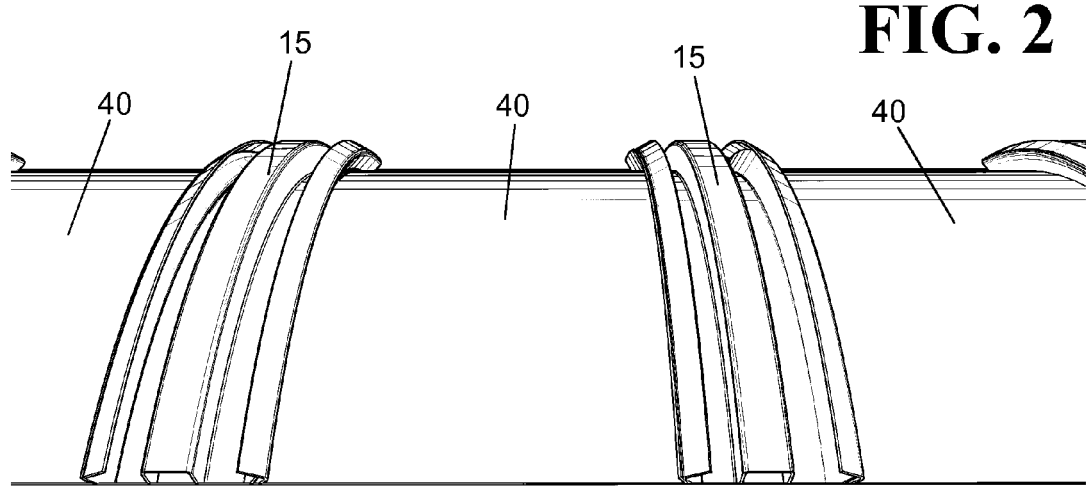
FIG. 2 shows a side view of a trailer roof constructed from roof bows and panels.

FIGS. 1 and 2 show an over the road trailer 10 having a plurality of roof bows 15 spanning over and across a storage area 20 within the trailer 10. The storage area is generally defined by the sidewalls 25 of the trailer, the front (not pictured), rear wall 30, and floor 35 of the trailer. Panels 40 are secured between the roof bows 15 to form the roof of the trailer. The arced curvature of the roof increases the structural integrity of the container by resisting downward forces and also acts to help shed precipitation from the top of the trailer. In northern climates where heavy snow may pile up on the roof of the trailer, the structural integrity and ability to shed precipitation are of key importance. Typical bow rises are expected to be on the order of an inch across the width of the trailer, however smaller or greater bowing may be used based on the intended usage of the trailer.

Figure 3:
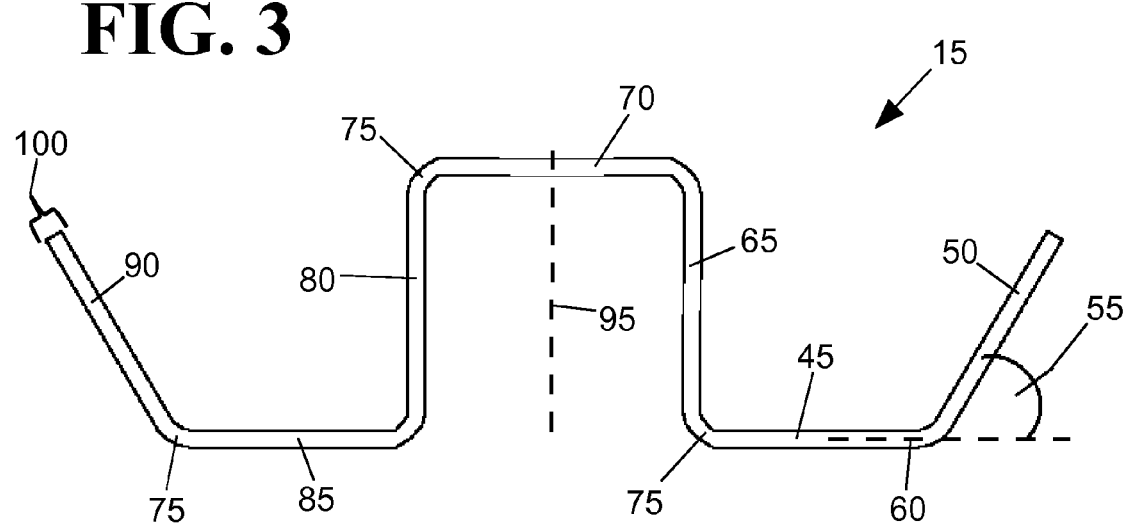
FIG. 3 shows a cross section of an isolated roof bow.
Figure 4:
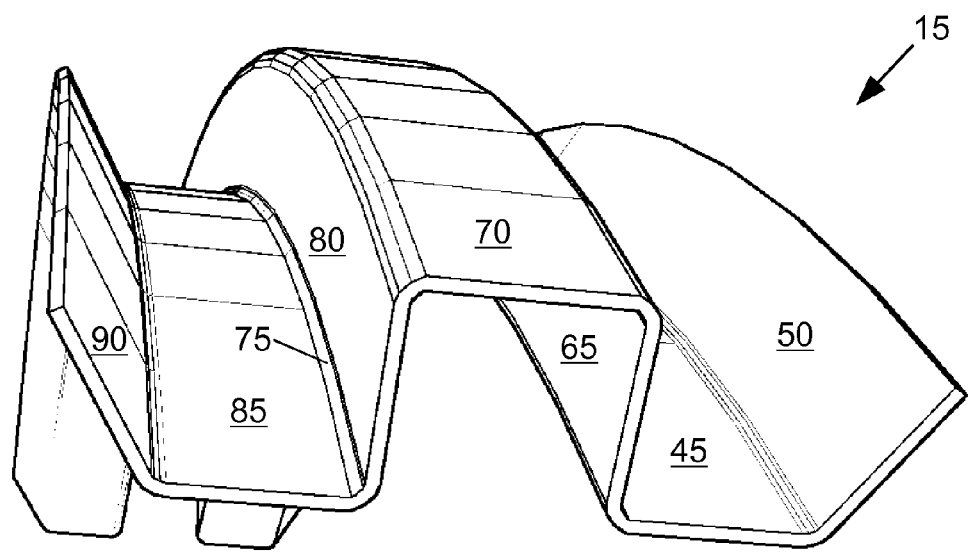
FIG. 4 shows a perspective view of an isolated roof bow.

FIGS. 3 and 4 illustrate a cross sectional and perspective view of a roof bow 15, respectively. The roof bows act to support the weight of the panels and other roof components and are preferably made from resilient materials such as metal or fiber reinforced resin that are both strong and resistant to wear and accidental damage. The roof bow includes a horizontally arced first bow slat 45 or first lower slat that extends between the sidewalls of the container. At the lateral end of the first bow slat 45 a first bow flange 50 extends upward away from the first bow slat 45. In the illustrated example, the first bow flange 50 extends away from the first bow slat 45 at 60 degrees 55 relative to the width 60 of the first bow slat. Preferred angles of extension for the flange from the first bow slat 45 are 45 to 70 degrees relative to the width 60 of the first bow slat 45. Angles between 45 and 70 degrees allow for tight locking between the roof bows and the panels while also providing a steeply angled surface that the flanges of the panels may be pushed upwardly against while installing the panels from within the trailer. The steep angle of the bow flange also facilitates deflection of the panel flange before it snaps into place.

A first vertical wall 65 extends from the first bow slat 45 to a second bow slat 70 or top slat. The joints 75 between the slats and the walls and flanges are preferably rounded to reduce the number of snag points on the ceiling of the trailer. A second wall 80 extends downward from the second bow slat 70 to a third bow slat 85 or second lower slat. A second bow flange 90 extends away from a third bow slat 85. In the illustrated example, the roof bow 15 is symmetric about an axis of symmetry 95 that bisects the second bow slat 70. While symmetric roof bows are not needed for the present invention, they assist in simplifying the manufacturing process. In the illustrated example, the thickness 100 of the roof bow 15 is substantially uniform throughout the entire roof bow. Substantially uniform is herein defined to mean uniform with slight variations at the joints and/or bends. While folding a single sheet of metal into a roof bow will generally yield a uniform thickness piece, it should be appreciated that certain areas of the roof bow may be thickened to increase the resilience of the roof bow, while other areas may be thinned to help reduce the weight of the cargo container.

Figure 5:
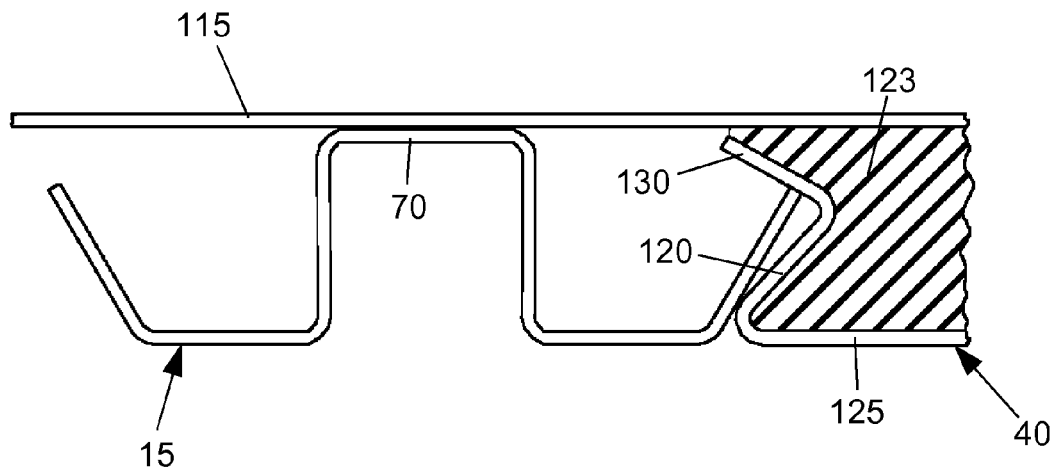
FIG. 5 shows a cross-sectional view of a roof bow secured to a roof liner and a panel.

FIG. 5 shows a cross sectional view of a roof bow 15, panel 40, and a liner 115. The panel includes a panel flange 120 that extends upward from a panel slat 125 between two roof bows. When not interconnecting with a roof bow, the panel flange 120 extends inwards to the panel slat 125 at an angle complimentary with the angle of the bow flanges. However, when interconnecting with the roof bow 15, the panel flange 15 is deflected away from the roof bows 15. The deflection of the panel flange causes the flange to be pressed against the bow flange thereby locking the panel in place. Extending from the panel flange is a locking flange 130 that contacts the tip of the bow flange and prevents the panel from moving downwardly from the roof bow 15. In the illustrated example, the locking flange 130 is located directly between the bow flange and the liner 115.

Figure 11:
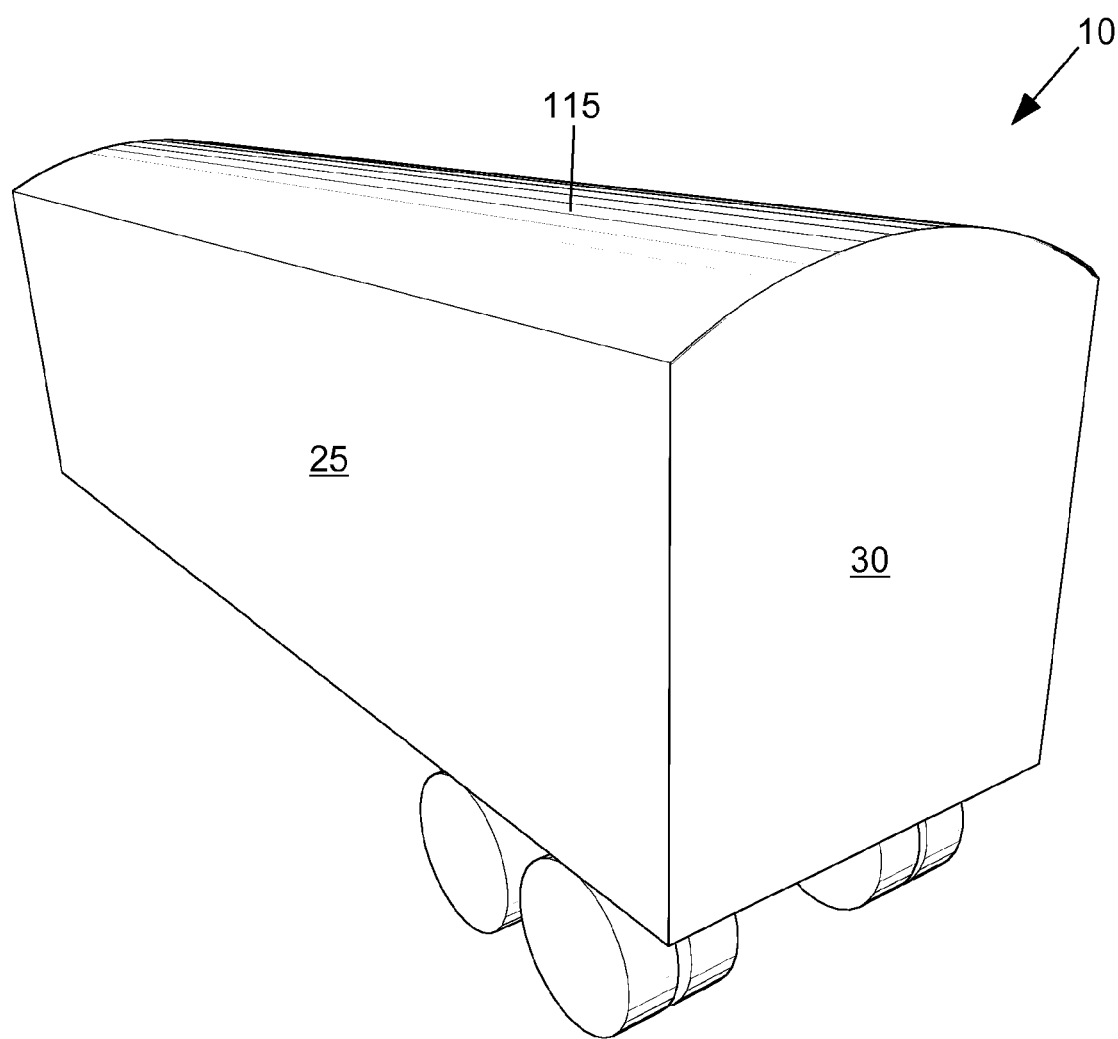
FIG. 11 shows a perspective view of a trailer having a roof with multiple panels secured between roof bows where a roof liner has been added above the bows and panels.

In FIG. 5, the liner 115 is secured to the second bow slat 70 of the roof bow 15. In practice, the liner 115 contacts numerous roof bows at their second bow slats and may extend for the entire length of the cargo container as seen in FIG. 11. A mechanical fastener may be used to secure the liner to the roof bows, or adhesives may be used. The liner 115 adds additional protection from precipitation, but also limits access to the flanges of the panels and roof bows. Thermal insulation 123 may be placed between the liner and the panels for trailers configured to carry refrigerated goods.

Figure 6:
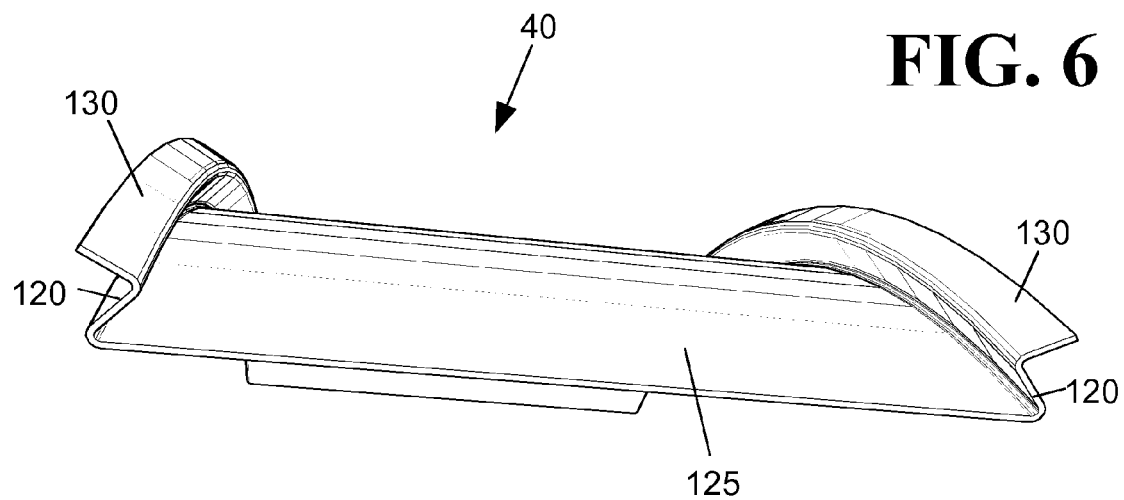
FIG. 6 shows a perspective view of an isolated panel.

FIG. 6 shows an example of an isolated panel 40 with a panel slat 125 extending between two panel flanges 120. The panels 40 may be constructed of a resilient material such as metal or fiber reinforced resin to resist wear, or they may be constructed from lightweight plastic to decrease the overall weight of the cargo container. If the panels are damaged or worn, they may be easily removed from between the roof bows by either retracting the panel flanges from above, or by forcefully pulling them down if they are constructed from plastic or other moderately resilient materials. In the illustrated example, the panel is constructed with an arched shape that matches the shape of the roof bows, however if the panels are constructed from sufficiently flexible materials they may be produced with flat slat portions and then bent to the shape of the roof bows during installation.

Figure 7:
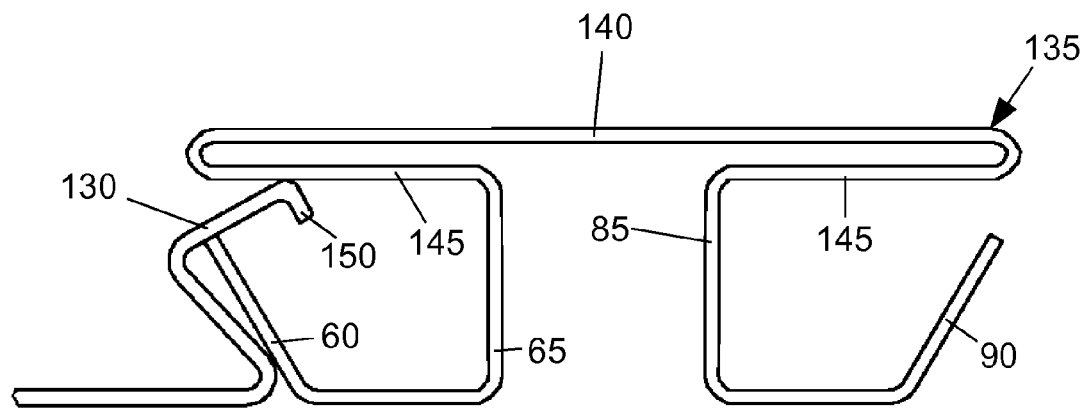
FIG. 7 shows a cross-sectional view of a roof bow secured to a panel.
Figure 8:
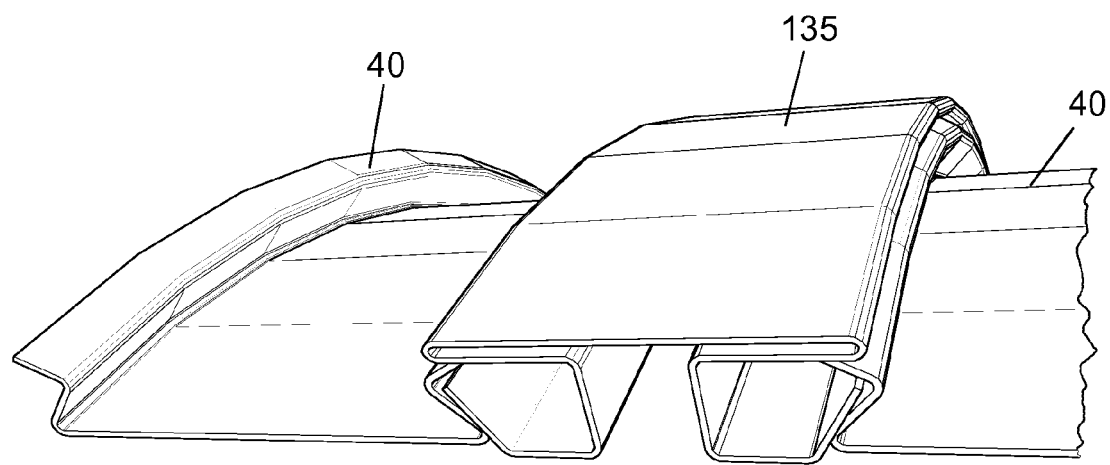
FIG. 8 shows a perspective view of a roof bow secured to two panels.

FIG. 7 shows an example of an all weather roof bow 135 with improved precipitation resistance when a liner is not utilized. The all weather roof bow 135 has a t-top section 140 with t-slats 145 that extend from the first wall 65 to the second wall 80. The t-slats extend past the first and second bow flanges (50, 90) to secure and cover the locking flanges 130 of the panels. Additionally, in the illustrated example the panel includes a securing flange 150 that directs any precipitation that enters the gap between the t-slat and the locking flange 130 to the gutter-like area above the first or third slats of the roof bow where it is shed from the roof of the trailer. FIG. 8 shows a perspective view of an all weather roof bow 135 secured to two panels 40.

Figure 9:
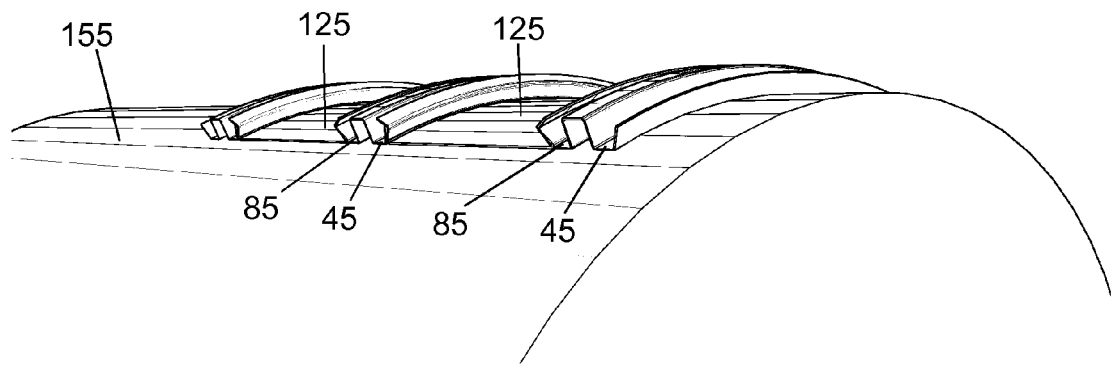
FIG. 9 shows a perspective view of roof bows and panels in relation to the surface of a geometric cylinder.
Figure 10:
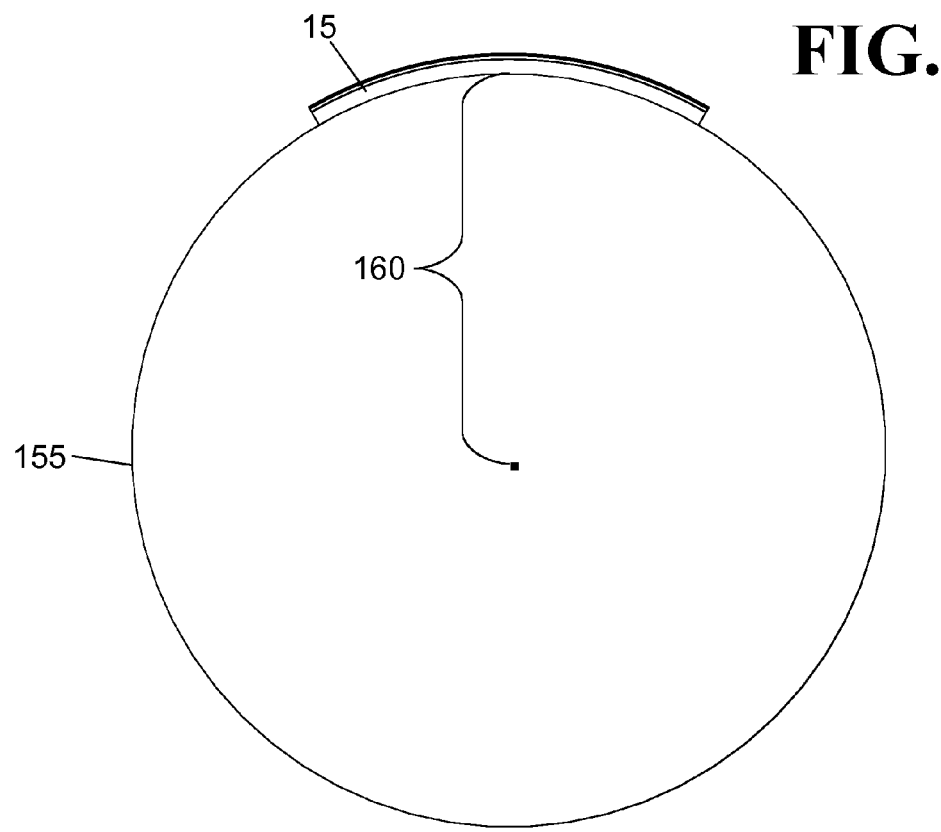
FIG. 10 shows a side view of roof bows and panels in relation to the surface of a geometric cylinder.

FIGS. 9 and 10 show a cargo container roof in relation to a geometric cylindrical surface 155. In the illustrated example, the first bow slats 45 and the third bow slats 85 of the roof bows, and the panel slats 125 are all positioned upon and extend upon a single geometric cylindrical surface 155. Having the numerous slats positioned upon and extending upon a single geometric surface creates a fairly smooth interior roof surface that is less likely to snag machinery or cargo. Due to the shape of the roof, the radius 160 of the geometric cylindrical surface 155 is generally expected to be substantially greater than the total height of the cargo container.

FIG. 11 illustrates an example of an over the road trailer 10 with roof bows and panels that have been fully covered by a liner 115. In the illustrated example, the gutters formed by the walls and first and third slats of the roof bows are not used to shed precipitation from the top of the trailer, so the sidewalls 25 extend up to and form water tight seals with the liner 115.

The inventors contemplate several alterations and improvements to the disclosed invention. Other alterations, variations, and combinations are possible that fall within the scope of the present invention. Although various embodiments of the present invention have been described, those skilled in the art will recognize more modifications that may be made that would nonetheless fall within the scope of the present invention. Therefore, the present invention should not be limited to the specific examples described.

I claim:

1. A cargo container with a roof over a storage area, the roof comprising:
 a first roof bow and a second roof bow, each roof bow extending over and across the storage area,
  having a first bow flange extending from a first bow slat; and
 a panel extending over and across the storage area between the first and second roof bows, the panel having
  a panel slat extending from a first panel flange to a second panel flange,
  the first panel flange located adjacent to the first bow flange of the first roof bow,
  the second panel flange located adjacent to the first bow flange of the second roof bow,
  a first locking flange extending from the first panel flange away from the second panel flange, and
  a second locking flange extending from the second panel flange away from the first panel flange.

2. The cargo container of claim 1 further comprising:
 each roof bow having a first wall and a second bow slat;
 the first wall of the first roof bow extending from the first bow slat of the first roof bow to the second bow slat of the first roof bow;
 the first wall of the second roof bow extending from the first bow slat of the second roof bow to a second bow slat of the second roof bow; and
 a roof liner extending between and secured to both the second bow slat of the first roof bow and the second bow slat of the second roof bow.

3. The cargo container of claim 2 wherein
 the first locking flange is located between the roof liner and the first flange of the first roof bow, and
 the second locking flange is located between the roof liner and the first flange of the second roof bow.

4. The cargo container of claim 2 further comprising:
 each roof bow having a second wall, a third bow slat, and a second bow flange;
 the second wall of the first roof bow extending from the second bow slat of the first roof bow distant from and parallel to the first wall of the first roof bow;
 the third bow slat of the first roof bow extending from the second wall of the first roof bow, away from the first bow slat of the first roof bow, to the second bow flange of the first roof bow;
 the second wall of the second roof bow extending from the second bow slat of the second roof bow distant from and parallel to the first wall of the second roof bow; and
 the third bow slat of the second roof bow extending from the second wall of the second roof bow, away from the first bow slat of the second roof bow, to the second bow flange of the second roof bow.

5. The cargo container of claim 4 wherein
 the first roof bow is symmetric about a first geometric plane passing through the second bow slat of the first roof bow; and the second roof bow is symmetric about a second geometric plane passing through the second bow slat of the second roof bow.

6. The cargo container of claim 5 wherein
the first bow slat of the first roof bow,
the third bow slat of the first roof bow,
the first bow slat of the second roof bow,
the third bow slat of the second roof bow, and
the panel slat are positioned upon and extend upon a single geometric cylindrical surface.

7. The cargo container of claim 1 wherein
both the first locking flange and the first panel flange contact and press upon
the first bow flange of the first roof bow.

8. The cargo container of claim 1 further comprising
the panel having a securing flange extending from the first locking flange towards the first bow slat of the first roof bow.

9. The cargo container of claim 1 wherein
the first roof bow includes
    a first wall extending from the first bow slat of the first roof bow to a second bow slat, the second bow slat extending towards the second roof bow; and
the first locking flange is secured between the first bow flange of the first roof bow and the second bow slat of the first roof bow.

10. The cargo container of claim 9 wherein
the first roof bow is constructed from a metal, and
the panel is constructed from a material selected from a group consisting of metal, plastic, and fiber reinforced resin.

11. The cargo container of claim 1 wherein
the first bow flange extends away from the first bow slat at between 45 and 70 degrees relative to a width of the first bow slat.

12. The cargo container of claim 1 wherein
the first roof bow consists of a single sheet of metal having a substantially uniform thickness.

13. A cargo container with a roof over a storage area, the roof comprising:
a roof bow with
    a top slat, a first lower slat, and a second lower slat, each of the slats extending over and across the storage area,
    a first wall extending vertically downward from the top slat to the first lower slat,
    a second wall extending vertically downward from the top slat to the second lower slat,
    the first wall separated from second wall by a width of the top slat,
    the first lower slat separated from second lower slat by the width of the top slat,
    a first flange extending away from the first lower slat away from the first wall, and
    a second flange extending away from the second lower slat away from the second wall;
a panel extending over and across the storage area, the panel having
    a panel slat with a panel flange secured to the first flange of the roof bow.

14. The cargo container of claim 13 further comprising:
a roof liner located above the panel and the roof bow, the roof liner secured to the top slat; and
a portion of the panel flange located between the first flange and the roof liner.

15. The cargo container of claim 14 further comprising:
thermal insulation secured between the panel slat ant the roof liner.

16. The cargo container of claim 13 wherein
the top slat,
the first lower slat,
the second lower slat, and
a panel slat are positioned upon and extend upon a single geometric cylindrical surface.

17. The cargo container of claim 16 wherein
the first flange extends away from the first lower slat at between 45 and 70 degrees relative to the single geometric cylindrical surface.

18. The cargo container of claim 16 wherein
the first wall extends down from the top slat parallel to the second wall, and
the first wall and the second wall both extend down from the top slat perpendicular to the single geometric surface.

19. A cargo container with a roof over a storage area, the roof comprising:
a first roof bow and a second roof bow, each roof bow having
    a top slat, a first lower slat, and a second lower slat, each of the slats extending over and across the storage area,
    a first wall extending vertically downward from the top slat to the first lower slat,
    a second wall extending vertically downward from the top slat to the second lower slat,
    the first wall separated from second wall by the width of the top slat,
    the first lower slat separated from second lower slat by a width of the top slat,
    a first flange extending away from the first lower slat away from the first wall, and
    a second flange extending away from the second lower slat away from the second wall;
a roof liner secured to
    the top slat of the first roof bow and
    the top slat of the second roof bow;
a panel having
    a panel slat with
        a first panel flange secured to the first flange of the first roof bow, and
        a second panel flange the first flange of the second roof bow.

20. The cargo container of claim 19 wherein
a portion of the first panel flange is located between first flange of the first roof bow and the roof liner, and
a portion of the second panel flange is located between first flange of the second roof bow and the roof liner.

* * * * *